July 29, 1958     G. J. CARLSON ET AL     2,845,447
PRODUCTION OF ALUMINUM ALCOHOLATES
Filed April 8, 1954
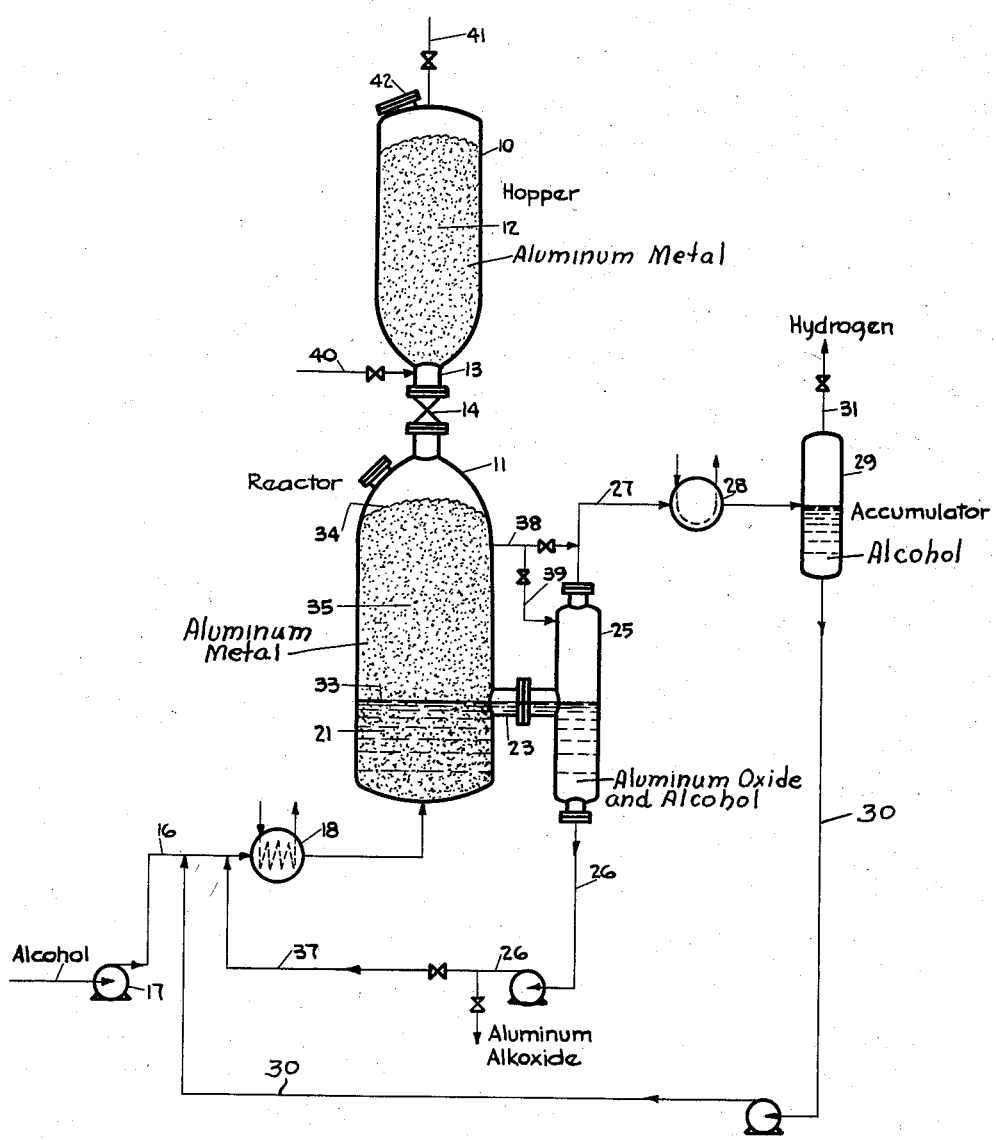
Inventors: George J. Carlson
George W. Gaertner
By: E. Walter Munk
Their Agent

United States Patent Office 2,845,447
Patented July 29, 1958

2,845,447
PRODUCTION OF ALUMINUM ALCOHOLATES

George J. Carlson, Berkeley, and George W. Gaertner, Oakland, Calif., assignors to Shell Development Company, New York, N. Y., a corporation of Delaware Application April 8, 1954, Serial No. 421,918

8 Claims. (Cl. 260—448)

This invention relates to an improved process for the production of aluminum alcoholates by the interaction of metallic aluminum and a hydrocarbon alcohol. The invention relates more particularly to the production of aluminum alcoholates by the interaction of metallic aluminum with a lower boiling secondary aliphatic alcohol.

Aluminum alcoholates, valuable as intermediate or starting materials in the production of chemical derivatives therefrom, are obtainable by the interaction of an alcohol with metallic aluminum under conditions resulting in the replacement of the hydrogen atom of the hydroxyl group of the alcohol by aluminum. Processes disclosed heretofore directed to the production of the aluminum alcoholates by the interaction of metallic aluminum and an alcohol are generally dependent upon the use of a promoter or activating agent, such as, for example, mercuric chloride, ferric chloride, aluminum chloride, stannic chloride, boron trioxide, iodine, etc., for the reaction. The introduction of such materials into the process generally entails difficulties the severity of which often militates against practical operation of the process. Their use generally results in a contamination of the reaction products. Since the ability to employ the reaction product in given fields of application is at times dependent upon its purity, costly operational procedures directed towards product purification are often necessitated resulting in substantial product loss. Most of these promoters possess characteristics such as toxicity, corrosiveness, etc., which render their use undesirable, if not hazardous. When the promoter employed is one possessing relatively high volatility the gaseous products are also contaminated, thereby presenting additional purification and/or disposal problems.

The serious nature of difficulties occasioned by the use of such promoters has resulted in endeavors to reduce to at least some extent their presence in substantial amounts in the reaction zone proper. It has been proposed to subject the aluminum to contact with the promotor before its introduction into the reaction zone. Such a procedure, however, occasions the need for additional equipment thereby increasing materially the cost and complexity of the process, and aggravating considerably the problem of oxygen exclusion, of avoiding product contamination, and of maintaining desired operating conditions.

It is an object of the present invention to provide an improved process enabling the more efficient production of aluminum alcoholates wherein the above-identified difficulties are obviated to at least a substantial degree.

An object of the present invention is the provision of an improved continuous process enabling the more efficient production of aluminum alcoholates by the interaction of metallic aluminum and a hydrocarbon alcohol in the absence of any added catalyst or promoter emanating from an external source.

Another object of the invention is the provision of an improved continuous process enabling the more efficient production of aluminum alcoholates by the interaction of metallic aluminum and a secondary aliphatic alcohol in the absence of promoters or catalysts emanating from an outside source.

A more particular object of the invention is the provision of an improved continuous process enabling the more efficient production of aluminum alcoholates by the interaction of metallic aluminum and a lower boiling secondary aliphatic alcohol having 3 or 4 carbon atoms to the molecule. Other objects and advantages of the invention will become apparent from the following detailed description thereof made with reference to the attached drawing wherein the single figure shows a more or less diagrammatic elevational view of one form of apparatus suitable for carrying out the process of the invention.

In accordance with the process of the invention aluminum alcoholates are obtained by the reaction of aluminum with a hydrocarbon alcohol, in the absence of catalysts or promoters emanating from an external source, by effecting the reaction under conditions assuring the presence of a substantial excess of aluminum metal throughout the course of the reaction. The method preferably employed to assure the presence of the substantial excess of aluminum throughout the course of the reaction may vary considerably within the scope of the invention. Thus, the reaction may be carried out in the liquid phase in a bed of solid material consisting essentially of aluminum metal.

In a preferred method of carrying out the invention aluminum metal and a hydrocarbon alcohol are introduced into a reaction zone maintained under sufficiently high pressure to maintain at least a substantial part of the alcohol therein in the liquid phase, and at a temperature sufficiently high to assure interaction of aluminum with the alcohol, and with introduction of aluminum metal and alcohol into the reaction zone at such a controlled rate that only a portion of the total aluminum present at any time in the reaction zone is below the liquid level therein. Thus in accordance with the preferred method of carrying out the process of the invention use is made of an elongated reaction zone, which is filled to at least a substantial degree with pieces, or fragments, of aluminum metal. A hydrocarbon alcohol is introduced into the lower part of the reaction zone. The reaction zone is maintained under a pressure which is sufficiently high to maintain at least a substantial part of the alcohol therein in the liquid phase. The lower part of the reaction zone is maintained at an elevated temperature assuring interaction of aluminum metal and alcohol with the formation of reaction products comprising aluminum alcoholate and hydrogen. Liquid, comprising reaction mixture including aluminum alcoholate and unconverted hydrocarbon alcohol, is withdrawn from the lower part of the reaction zone. Introduction of hydrocarbon alcohol into the lower part of the reaction zone and withdrawal of liquid therefrom is carried out at a controlled rate assuring substantially continuous contact of liquid alcohol with the lower part of the bed of aluminum and the maintenance of the liquid level in said reaction zone at all times substantially below the upper level of the bed of aluminum metal. Aluminum metal is continuously, or intermittently, introduced into the upper part of the reaction zone to assure the maintenance of the upper level of the bed of aluminum metal at a height substantially above that of the liquid level in the lower part of the reaction zone. This method may be described as one wherein the reaction zone proper is defined by the lower fractional part of an elongated bed of metallic aluminum.

Metallic aluminum employed in the process of the invention and forming the bed, the lower part of which defines the reaction zone proper, and which functions as reactant to the process as well, may be obtained from any suitable source. The aluminum is employed in the form of pieces, fragments, chunks, pellets, turnings, or the like. The average size of the pieces, chunks, or fragments of aluminum employed may vary considerably within the scope of the invention. In general, it is preferred to employ aluminum fragments ranging in size from about 0.1 to about 3 inches, and preferably from about ⅛ inch to about 1 inch in diameter. Use of aluminum in smaller or larger pieces may, however, be employed within the scope of the invention. The aluminum employed need not necessarily be in a pure state. The impurity tolerated in the product will, to some extent, determine the degree of impurity permissible in the aluminum charge to the system. Thus, the aluminum employed may consist of commercially available forms of aluminum, such as, for example, granulated ingot, grained ingot, aluminum dross, aluminum turnings, etc.

The aluminum alcoholates are obtained by the reaction of the aluminum metal with a hydrocarbon alcohol; the specific alcohol employed being determined by the nature of the product desired. Thus, the alcohol charged to the system may comprise, for example, an aliphatic alcohol, such as the following having 3 to 9 carbon atoms per molecule, propyl-, butyl-, amyl-, hexyl-, heptyl-, octyl-, nonyl-alcohols, of branched and straight chain structure, and higher homologues thereof. The process of the invention is applicable to the production of aluminum alcoholates from the higher aliphatic alcohols, such as, for example, up to the carnaubyl alcohol and ceryl alcohol. The alcohol charge to the process may consist of a mixture of two or more alcohols. Suitable alcoholic charge includes the mixtures of alcohols obtained in such chemical synthesis processes as the oxo process, and the like. The process of the invention is applied with particular advantage to the production of the aluminum alcoholates of the secondary alcohols, such as, the aliphatic alcohols wherein the OH group is attached to a secondary carbon atom, for example, isopropyl alcohol, secondary butyl alcohol, the secondary amyl alcohols, the secondary hexyl alcohols, the secondary heptyl alcohols and their higher homologues. A particular advantage of the process resides in its ability to produce with substantially improved efficiency the aluminum alcoholates of the secondary alcohols having from 3 to 4 carbon atoms to the molecule, that is, isopropyl alcohol and secondary butyl alcohol.

Diluents which are liquid and substantially inert under the conditions of execution of the reaction may be employed. Preferably employed are solvents for the alcohols, which solvents are inert and liquid under the reaction conditions. Solvents are preferably employed when reacting higher boiling alcohols. The solvents or diluents may be introduced into the system with the alcohol or separately. Under certain conditions use is made of less volatile diluents within the scope of the invention. Thus, normally liquid materials inert under the reaction conditions may be added to aid in maintaining the reaction temperature. Vaporization of the diluent within the reaction zone may be relied upon to remove a part of the exothermic heat of reaction.

Execution of the process of the invention is carried out at a temperature in the range of, for example, from about 80° C. to about 250° C. When employing the lower boiling secondary aliphatic alcohols as charge, particularly those having from 3 to 4 carbon atoms to the molecule, the use of a temperature in the range of from about 100° C. to about 150° C., preferably in the range of from about 110° C. to about 125° C., is generally satisfactory. Higher or lower temperatures may, however, be employed within the scope of the invention. The specific temperature preferably employed will depend largely upon the specific alcohol charged to the system. Temperatures are maintained below those resulting in any substantial decomposition of the desired aluminum alkoxide reaction products.

The process of the invention may be carried out at subatmospheric, atmospheric or superatmospheric pressures. The specific pressure preferably maintained within the reaction zone will depend to some extent upon the boiling temperature of the specific alcohol charge to the system. Pressures ranging from about atmospheric to about 500 p. s. i. g. and higher may suitably be employed. In general, it has been found that when employing as charge an aliphatic secondary alcohol having a boiling temperature below about 200° C., particularly the lower boiling secondary alcohols including those having from 3 to 4 carbon atoms, pressures ranging from about 15 to about 100 p. s. i. g., and preferably from about 30 to about 65 p. s. i. g., are particularly suitable.

Conditions within the bed of aluminum metal are generally controlled to maintain the desired low liquid level therein and to avoid decomposition to any substantial extent of aluminum alcoholate formed. Interaction of aluminum with the alcohol is initiated by bringing the lower part of the bed of aluminum to the reaction temperature. Initiation of the reaction is facilitated by reducing to at least a substantial degree the water content in the lower part of the bed. Once the reaction has been started substantial amounts of water may be tolerated in the alcohol charge to the system. Although not essential to the process of the invention, initiation of the reaction is often facilitated by introducing into the lower part of the bed of aluminum a small amount of aluminum alkoxide. The aluminum alkoxide thus introduced into the system may suitably be the material produced in a previous operation of the process. Since the reaction is exothermic, means are provided for maintaining the desired reaction temperature within the lower part of the bed by the removal of excess heat therefrom. Means for the removal of such excess heat may comprise the vaporization within the reactor of part of the alcohol, and diluent if present, and the removal of the latent heat of vaporization before returning these materials to the reaction zone. Additional expedients comprise, for example, the cooling of a portion of the liquid reaction mixture outside the system, the provision of cooling means, such as closed cooling coils within the reaction section of the bed, etc.

In order that the invention may be more readily understood it will be described in detail as applied to the production of aluminum alkoxide by the interaction of aluminum metal and a lower boiling secondary aliphatic alcohol, with reference to the attached drawing.

The process of the invention may suitably be carried out in a form of apparatus comprising a zone of supply, such as, for example, chamber 10 positioned above a zone containing a bed of metallic aluminum, such as, for example, a chamber 11. A supply of aluminum metal 12 in the form of fragments or pieces, such as, for example, aluminum ingot in granulated form having a diameter of from about ⅛ inch to about 1 inch is maintained in chamber 10. The chamber 10 is in open communication with chamber 11 by means of a conduit, or passage, 13 provided with a valve 14. When starting the operation aluminum metal is passed from chamber 10 into chamber 11 in an amount filling at least a substantial portion of chamber 11.

A hydrocarbon alcohol, such as a secondary aliphatic alcohol, for example, isopropyl alcohol emanating from an outside source is forced by means of pump 17 through line 16 into the lower part of chamber 11. Means enabling the introduction or withdrawal of heat from the contents of line 16, such as, for example, an indirect heat exchanger 18, are provided. In initiating the operation the hydrocarbon alcohol flowing through line 16 is preheated, by means of indirect heat exchanger 18, to an elevated temperature at which interaction of isopropyl alcohol with aluminum metal takes place. Heating of the isopropyl alcohol to a temperature in the range of, for example, from about 115° C. to about 150° C. has been found satisfactory. Somewhat higher or lower temperature may, however, suitably be employed.

It has been found that at the elevated temperature and in the presence of the substantial excess of aluminum the reaction is initiated in the absence of any introduction of catalysts or activators from an outside source. During the initiation of the reaction it is preferred to maintain the water content of the isopropyl alcohol charge at a minimum, for example, preferably below about 0.05%. Removal of water from the alcohol charge may be accomplished by conventional means not shown in the drawing. It has been found that the introduction into the reaction zone of a small amount of an aluminum alkoxide, for example, aluminum isopropoxide made in a previous operation, will facilitate the initiation of the reaction. The introduction of the alkoxide in amount ranging from about 1 to about 10% by weight of the alcohol charge has been found satisfactory. Higher or lower amounts may, however, be employed within the scope of the invention. Often the introduction of the alkoxide will enable initiation of the reaction at a somewhat lower pressure and temperature than would be required in its absence. It also obviates induction periods at times encountered due to the presence of inhibiting materials, as impurities, in the reaction zone.

Once initiated, the reaction being of exothermic nature, will continue without application of further amounts of heat. Temperatures within the lower part, 21, of the bed of aluminum are maintained in the range of from about 80° C. to 150° C., and preferably from 100° C. to 130° C.; a temperature in the range of from about 110° C. to about 125° C. being particularly preferred. A superatmospheric pressure below about 500 p. s. i. g., preferably in the range of from about 10 to about 75 p. s. i. g. is maintained within chamber 11. Under the above-defined conditions interaction of the aluminum metal with the hydrocarbon alcohol will take place with the formation of reaction products comprising aluminum isopropoxide and hydrogen.

Liquid, comprising aluminum isopropoxide and unconverted isopropyl alcohol, and gaseous products comprising hydrogen and isopropyl alcohol vapors, are passed from a lower part of the bed of aluminum in chamber 11, through transfer line 23, into a suitable disengaging zone comprising, for example, a chamber 25. Within chamber 25 a liquid phase comprising unconverted isopropyl alcohol and aluminum isopropoxide is separated from a gaseous phase comprising isopropyl alcohol vapors and hydrogen. Liquid phase is withdrawn from chamber 25 through valved line 26 and eliminated from the system as a final product. The gaseous phase is passed from chamber 25 through line 27, provided with condenser 28, into accumulator 29. In passing through condenser 28, at least a substantial part of the isopropyl alcohol content of the stream passing therethrough is condensed. Liquid consisting essentially of isopropyl alcohol is taken from chamber 29 and recycled through line 30 into charge line 16. Gases consisting essentially of hydrogen are taken from accumulator 29 by means of valved line 31 as a final product.

An essential feature of the process of the invention is the provision of the steady production of a stream of hydrogen of high purity.

Under the above-defined conditions interaction of the aluminum metal and isopropyl alcohol proceeds smoothly and at a uniform rate, the magnitude of which is readily controlled by varying the rate of introduction of the isopropyl alcohol into the lower part of chamber 11. In general, it has been found desirable to adjust the rate of isopropyl alcohol introduction into the lower part of chamber 11 in such a manner that the liquid reaction mixture passing from chamber 11 through transfer line 23 will generally comprise not more than about 30%, and preferably from about 5 to about 15%, by weight of isopropyl alcohol.

The rate of introduction of alcohol into the reaction chamber 11 through line 16, and of withdrawal of liquid reaction mixture therefrom through line 23, is controlled at all times to assure the maintaining of the liquid level, 33, of the reaction mixture in the lower part of the bed of aluminum metal. Aluminum metal is passed from chamber 10 into chamber 11 to replace aluminum metal consumed during the course of the reaction in the lower part, 21, of the bed in chamber 11, and to assure thereby the maintenance of the top level 34 of the bed of metal alumina high up in chamber 11. Essential to the attainment of the objects of the invention is the maintenance of a substantial distance between the liquid level 33 in the lower part of the bed of aluminum and the upper level 34 defining the top of the bed of solid aluminum metal.

The desired reaction temperatures are maintained in the lower part of the bed of aluminum metal in chamber 11 by controlling the temperature of the alcohol charged thereto as well as by controlling the amount of materials recycled. Heat exchanger 18 enables cooling of the alcohol introduced into the lower part of chamber 11. Additional quantities of exothermic heat of reaction are removed by controlling the volume of material withdrawn from chamber 11 and circulated through cooling equipment before being returned to the reaction chamber. Thus, a part of the liquid phase separated in chamber 25 and withdrawn therefrom through line 26 may be by-passed through line 37 and introduced into line 16 at a point up-stream from heat exchanger 18.

If desired a gaseous stream, consisting essentially of gaseous reaction products comprising hydrogen and isopropyl alcohol vapors, may be withdrawn separately from the chamber 11 and passed to the accumulator or disengaging chamber. To this effect valved lines 38 and 39 are provided enabling the passage of such gaseous mixture either directly into line 27 or in part or entirety into disengaging chamber 25.

The avoidance of introduction of oxygen into chamber 11 is not difficult because of the substantially complete absence of mechanical equipment. A valved line 40 is provided to enable the introduction of an inert gas, for example, nitrogen, or a normally gaseous hydrocarbon, such as methane, ethane or the like, into the lower part of chamber 10 to sweep at least a substantial part of any air therefrom. A valved line 41 is provided for the elimination of gaseous materials, including inert gas introduced through line 40, from the system. A manhole 42 is provided for the introduction of aluminum metal into the supply zone comprising chamber 10.

Under the above-defined conditions the aluminum and hydrocarbon alcohol interact in the lower part of the bed of metal aluminum, and the reaction proceeds at a uniform, smooth and readily controlled rate in the absence of the introduction of extraneous catalysts, promoters or the like. Without intent to limit in anywise the scope of the invention by theory advanced herein to set forth more clearly the nature of the invention, it is believed that the section of aluminum metal lying between the liquid level 33 and the upper level 34 of the bed, may well function as an activating zone wherein the aluminum metal is brought to a state of high activity by its passage therethrough, towards, and into the reaction section proper, 21, of the bed. Such activation may well be attributable to at least a substantial degree, to contact of the aluminum metal with vapors and entrained liquid, mist or spray, emanating from the reaction section, 21, of the bed. Reaction products obtained as a result of the interaction of the hydrocarbon alcohol and the aluminum metal are believed to consist predominantly of aluminum isopropoxides formed by the substitution of aluminum metal for a hydrogen atom in the hydroxyl group of the isopropyl alcohol. Predominant in the reaction products is the aluminum isopropoxide approximating the empirical formula $Al(OC_3H_7)_3$.

Although the detailed description of the invention has stressed the production of aluminum isopropoxide, it is to be pointed out that the invention is in no wise limited to the production of only this aluminum alkoxide. By substituting for the isopropyl alcohol other members of the above-defined hydrocarbon alcohols, there are obtained aluminum alkoxides corresponding to those obtained by replacing the hydrogen atom of the hydroxyl group thereof with aluminum. Thus, by introducing isobutyl alcohol into the reactor instead of isopropyl alcohol there is obtained aluminum isobutoxide. From higher alcohols the corresponding aluminum alkoxides are obtained.

Because the reaction, and possibly even activation of the aluminum metal, proceeds in spaces formed by individual particles of the aluminum metal constituting the bed, it is preferred to avoid the use of aluminum metal in too fine a particle size.

In a preferred method of carrying out the process of the invention the isopropoxide is eliminated from chamber 25 through line 26 in the form of a solution in isopropyl alcohol. If desired at least a substantial part of the isopropyl alcohol may be removed from the reaction mixture prior to its elimination from the system. To this effect, means not shown in the drawing may be provided to assure the vaporization of at least a substantial part of the isopropyl alcohol entering chamber 25 in the liquid reaction mixture. Such means, not shown in the drawing, may comprise, for example, a closed heating coil, a reboiler, or the like in the lower part of disengaging chamber 25. Other suitable means enabling vaporization of the alcohol within chamber 25 may be resorted to within the scope of the invention.

The efficiency with which aluminum alkoxides are produced in accordance with the process of the invention is illustrated by the following examples.

*Example 1*

In an operation identified by the designation "Run A," a reaction chamber was filled with granulated aluminum ingot having the following composition:

| | Percent weight |
|---|---|
| Aluminum | 99.6 |
| Iron | 0.3 |
| Silicon | 0.1 |

The individual particles of aluminum were about 8 to 12 mm. long and 3 to 6 mm. thick. Isopropyl alcohol was introduced into the lower part of the bed and therein brought to a temperature of 125° C. Pressure in the reaction chamber was maintained at 50 p. s. i. g. Under these conditions aluminum metal and isopropyl alcohol interacted in the absence of catalyst or promoter from an external source. The lower part of the chamber was maintained at 125° C. throughout the operation by indirect heat exchange, employing a closed coil positioned in the lower part of the bed of aluminum. Initially steam was passed through the closed coil in the lower part of the bed of aluminum until the reaction temperature was attained therein, then cooling water was substituted for the steam in the coil. Products comprising hydrogen, unconverted alcohol and aluminum isopropoxide were withdrawn continuously from the reactor in a mole ratio of hydrogen to alcohol to aluminum isopropoxide of 1.22:0.83:0.815. Ispropyl alcohol was introduced into the lower part of the reaction chamber at a liquid hourly space velocity of 1.0. Reaction products were continuously withdrawn from the reaction chamber to maintain the liquid level constant in the lower part of the bed of aluminum metal. Aluminum metal was continuously introduced into the upper part of the reaction chamber throughout the operation to replace the aluminum used up in the reaction in the lower part of the chamber and to maintain the chamber full of the aluminum metal. Aluminum entered into reaction at a rate of 5.5 pounds of aluminum per hour per cubic foot of aluminum immersed below the liquid level maintained in the bed of aluminum metal. There was obtained a conversion of isopropyl alcohol to aluminum isopropoxide of 75%.

In an operation identified by the designation "Run B" the operation of "Run A" was repeated under substantially identical conditions but with the exception that isopropyl alcohol was introduced into the reactor at a liquid hourly space velocity of 0.24. There was obtained a conversion of isopropyl alcohol to aluminum isopropoxide of 84%. Under these conditions products consisting essentially of hydrogen, alcohol and aluminum alkoxide were removed from the reactor in a mole ratio of hydrogen to alcohol to aluminum alkoxide of 0.34:0.13:0.223, respectively.

We claim as our invention:

1. The continuous process for the production of aluminum alcoholates which comprises, introducing a continuous stream of secondary aliphatic alcohol having 3 to 9 carbon atoms per molecule into the lower part of a fixed bed of pieces of aluminum metal maintained at about 80° to about 250° C. and under a pressure sufficient to maintain a pool of alcohol in the liquid phase in the lower part only of said bed of aluminum, thereby reacting said secondary alcohol with aluminum with formation of reaction products comprising aluminum alcoholate and hydrogen in said pool of alcohol in the absence of any added catalyst, continuously withdrawing liquid comprising said aluminum alcoholate and unconverted alcohol from said pool of liquid, adding aluminum metal at the top of the bed at a controlled rate to replace the aluminum reacted substantially as rapidly as it is consumed, and controlling the rate of introduction of alcohol and of said aluminum into said bed and the rate of withdrawal of said aluminum alcoholate-containing liquid to maintain the liquid level of said pool of liquid at all times in the lower part of the bed so the portion of the bed of aluminum thereabove functions as an activating zone and the process can proceed without added catalyst due to the aluminum in the upper part of the bed being conditioned by the presence of the liquid in the reaction zone in the lower part of the bed.

2. The process in accordance with claim 1 wherein said alcohol is secondary butyl alcohol.

3. The process in accordance with claim 1 wherein the rate of introduction of said alcohol into said bed and the rate of withdrawal of said aluminum alkoxide-containing liquid from said bed is further correlated to maintain the concentration of unconverted alcohol in the liquid pool in said bed below about 30%.

4. The process in accordance with claim 1 wherein the rate of introduction of said alcohol into said bed and the rate of withdrawal of said aluminum alkoxide-containing liquid from said bed is further correlated to maintain the concentration of unconverted alcohol in the liquid pool in said bed in the range of from about 5 to about 15%.

5. The continuous process for the production of aluminum isopropoxide which comprises introducing a continuous stream of isopropyl alcohol into the lower part of a fixed bed of pieces of aluminum metal maintained at a temperature of from about 80 to about 150° C., and at a sufficiently high pressure to maintain a pool of liquid isopropyl alcohol in the lower part only of said bed of aluminum, thereby reacting isopropyl alcohol with aluminum to form aluminum isopropoxide and hydrogen in said pool of isopropyl alcohol in the absence of added catalyst, continuously withdrawing liquid comprising aluminum isopropoxide and unconverted isopropyl alcohol from said pool of liquid in the lower part of said bed, adding aluminum metal to the top of said bed at a rate substantially equal to that at which aluminum metal is consumed in the reaction taking place within the lower part of said bed, and controlling the rate at which said aluminum metal and said isopropyl alcohol are introduced into said bed and the rate at which aluminum isopropoxide-containing liquid is withdrawn from said pool of liquid in said bed to maintain the liquid level of said pool at all times in the lower part of the bed of aluminum so the portion of the bed of aluminum thereabove functions as an activating zone and the process can proceed without added catalyst due to the aluminum in the upper part of the bed being conditioned by the presence of the liquid in the reaction zone in the lower part of the bed.

6. The process in accordance with claim 5 wherein said bed is maintained under a pressure in the range of from 10 to about 75 pounds per square inch guage.

7. The process in accordance with claim 5 wherein the rate of introduction of said alcohol into said bed and the rate of withdrawal of said aluminum alkoxide-containing liquid from said bed is further correlated to maintain the concentration of unconverted isopropyl alcohol in the liquid pool in said bed below about 30%.

8. The process in accordance with claim 5 wherein the rate of introduction of said alcohol into said bed and the rate of withdrawal of said aluminum alkoxide-containing liquid from said bed is further correlated to maintain the concentration of unconverted isopropyl alcohol in the liquid pool in said bed in the range of from about 5 to about 15%.

References Cited in the file of this patent

UNITED STATES PATENTS

| | | |
|---|---|---|
| 2,440,750 | Kraus | May 4, 1948 |
| 2,666,076 | Rex et al. | Jan. 12, 1954 |

FOREIGN PATENTS

| | | |
|---|---|---|
| 245,473 | Great Britain | June 17, 1926 |
| 454,480 | Great Britain | Oct. 1, 1936 |
| 544,690 | Germany | Feb. 20, 1932 |
| 602,376 | Germany | Sept. 7, 1934 |
| 190,421 | Switzerland | Mar. 24, 1936 |

OTHER REFERENCES

Sidgwick: Chemical Elements and Their Compounds, vol. 1, page 421, Oxford Univ. Press, London (1950).